United States Patent [19]

Melton

[11] Patent Number: 4,706,407
[45] Date of Patent: Nov. 17, 1987

[54] ANIMAL TRAP

[76] Inventor: Melvin M. Melton, 511 Avenida Del Mar, No. C, San Clemente, Calif. 92672

[21] Appl. No.: 881,909

[22] Filed: Jul. 2, 1986

Related U.S. Application Data

[63] Continuation of Ser. No. 784,535, Oct. 4, 1985.

[51] Int. Cl.$^4$ ........................ A01M 23/04; A01M 1/10
[52] U.S. Cl. ............................................ 43/69; 43/107
[58] Field of Search .................................... 43/69, 107

[56] References Cited

U.S. PATENT DOCUMENTS

| | | | |
|---|---|---|---|
| 179,205 | 6/1876 | Kramer | 43/69 |
| 335,081 | 1/1886 | Long | 43/69 |
| 816,102 | 3/1906 | Kittrell | 43/69 |
| 887,443 | 5/1908 | Pierce | 43/69 |
| 894,962 | 8/1908 | Lund | 43/69 |
| 1,185,452 | 5/1916 | Tucker | 43/69 |
| 1,258,960 | 3/1918 | Swain | 43/69 |
| 2,775,844 | 1/1957 | Farrell | 43/69 |

FOREIGN PATENT DOCUMENTS 768378  10/1967  Canada .................................... 43/69

Primary Examiner—Gene P. Crosby
Attorney, Agent, or Firm—Leonard Tachner

[57] ABSTRACT

An animal trap especially suited for trapping rodents such as rats and other small animals, in one embodiment comprising a generally cylindrical or rectangular container having a movable top adapted for limited rotation in one direction about a pair of centrally positioned fulcrum points in response to the animal's weight on one side of the top on which is provided a suitable bait. The top is normally positioned horizontally fully covering the interior of the container. Upon activation of the top in response to the animal's weight on the trigger side of the top, the top rotates to a substantially vertical position causing the animal to fall into the container and permitting the top to reset itself horizontally for trapping another animal. The trap is preferably configured to cause the animal to have all of his weight on the non-trigger side of the top before it goes after the bait on the trigger side of the top. A suitable ramp may be provided leading up to the non-trigger side of the top to promote such behavior. An additional embodiment of the invention, also using the animal's weight to activate an otherwise balanced horizontal surface, is especially configured for trapping insects such as cockroaches and the like.

1 Claim, 16 Drawing Figures

ANIMAL TRAP

This is a continuation of application Ser. No. 784,535, filed Oct. 4, 1985.

BACKGROUND OF THE INVENTION

1. Field of the Invention

The present invention relates generally to animal traps and more specifically, to traps particularly suitable for catching rats, other small rodents and insects in a container from which the animals may be readily discarded.

2. Prior Art

The art of animal traps is old and many different trap configurations have been designed in an attempt to provide a reliable and inexpensive device for capturing and disposing of small animals such as rats and other rodents. The most common trap of current use if the well-known bait spring device which has achieved commercial success primarily because it is of simple design and relatively low cost. Unfortunately, the bait loaded spring-type trap is disadvantageous in a number of respects. One such disadvantage is the possibility of injury to the user in setting the trap if a spring loaded bar designed to kill the rodent is inadvertently released while fingers or other human body parts are in the way. The risk of injury is especially high to young children or household pets whose curiosity gets the better of them. Another significant disadvantage to the conventional low-cost trap is the distastefulness of having to observe or even clean up the blood or other parts of the rodent that has been caught and killed by the trap. Other traps employ poisons or gummy substances that are either dangerous or which become ineffective because of animal conditioning or genetic variations which lead to resistant offspring.

Thus, there has been a long-felt need for a simple and low cost rodent and insect trap that is at least as inexpensive as the aforementioned conventional spring loaded trap but which does not present the noted disadvantages of such spring loaded traps. A number of attempts have been made to provide a trap which satisfies these criteria, but typically either the cost or complexity or both and the reliability of such traps have beenn less than desirable and the aforementioned long-felt need has remained unsatisfied. By way of example, the following U.S. patents disclose animal traps which are relevant to varying degrees to the present invention:

1,240,248; Pease, et al
1,273,185; Reich
1,581,297; Schmuck

The patent to Pease et al discloses an animal trap including a tube that is tapered so that the greater weight of the body lies near the open end which may be closed by a gate which is adapted for vertical motion within a pair of vertical skills. When the animal runs into the trap, the animals weight unbalances the trap towards the rear causing the gate to close trapping the animal inside. A similar concept is disclosed in the Reich patent in which an animal trap in the form of a mailbox-shaped tube is again adapted to rotate about a foot which is integral and at right angles to a door. When the weight of the animal forces the tube to rotate rearwardly about the foot, the foot collapses forward thereby closing the door. A forwardly positioned plate assures that the initial weight of the trap is such that the trap will be inclined towards the forward portion thereof until the animal enters the trap. Still another disclosure of a device that uses a similar concept is shown in the patent to Schmuck in which a rectangular tube is again balanced on a V-shaped fulcrum support. The open end of the tube is initially inclined downwardly and includes a door or closure which is designed to lower automatically within a pair of parallel slots when the weight of the animal forces the rearward portion of the tube to be lowered and the forward open portion of the tube to be raised.

It can be seen that all of the aforementioned prior art patents disclose animal traps which attempt to overcome the aforementioned deficiencies of the spring loaded conventional trap. More specifically, each discloses a device which obviates the aforementioned risk of injury to the user while setting the trap and each discloses a device which is designed to contain the trapped animal thereby removing the requirement for observing and/or cleaning up the mess created by the spring loaded device. Unfortunately, in overcoming these disadvantages, the patented devices result in additional disadvantages which render them commercially undesirable for providing substitutes for the inexpensive conventional trap described above. For example, in each instance of the aforementioned prior art patents, the door closing mechanism is far too complex and unreliable thereby reducing the probability of trapping the animal. Furthermore, each such device is of a generally complex configuration which is not conducive to low cost manufacturing techniques and which therefore cannot be produced at a cost which would permit them to be competitive in the marketplace as compared to the aforementioned conventional spring loaded or poison devices.

SUMMARY OF THE INVENTION

The present invention overcomes the aforementioned disadvantages of the prior art by providing a trap of a generally cylindrical or rectangular container configuration which is specifically designed to be manufactured by low cost techniques such as plastic molding and like, which is reliable in its operations and free of any risk of injury to the user. Furthermore, the present invention uses a top or door which is of simple and reliable configuration and which is configured to merely rotate to trap the animal that has entered the invention. The aforementioned top or door and the novel interconnection thereof with the container are the principal unique features of the present invention. More specifically, unlike the relatively complex configurations of the aforementioned prior art, the container of the present invention is formed of an animal collection means and a top having two integrated substantially planar surfaces, one of which is a trigger surface whereby the weight of the rodent entering upon the trigger surface of the container activates rotation of the top thereby trapping the rodent within the container. However, unlike the prior art devices previously described, the container of the present invention comprises a unitary smooth surface device without pivots or feet or other affixed or odd shaped structures which would otherwise add to the complexity and cost of the device. Furthermore, the present invention does not require springs and can be effective in killing animals trapped therein without the use of poisons or gummy substances.

OBJECTS OF THE INVENTION

It is therefore a principal object of the present invention to provide a rodent trap which substantially reduces or entirely overcomes the noted disadvantages of conventional traps and which is still of low cost configuration and therefore commercially more attractive than conventional devices.

It is an additional object of the present invention to provide a rodent trap which is of substantailly uniform integral configuration particularly suitable for low cost plastic molding manufacture or manufactured by other comparable low cost techniques.

It is still in additional object of the present invention to provide a rodent trap which is reliable in operation, free of risk of injury to the user, and which is configured to be produced at sufficiently low cost to make it commercially competitive with conventional spring loaded or poison-based traps.

BRIEF DESCRIPTION OF THE DRAWINGS

The aforementioned objects and advantages of the invention as well as additional objects and advantages thereof, will be more fully understood hereinafter as a result of a detailed description of preferred embodiments of the invention when taken in conjunction with the following drawings in which.

DESCRIPTION OF PREFERRED EMBODIMENTS

The First Embodiment

Figure 1:
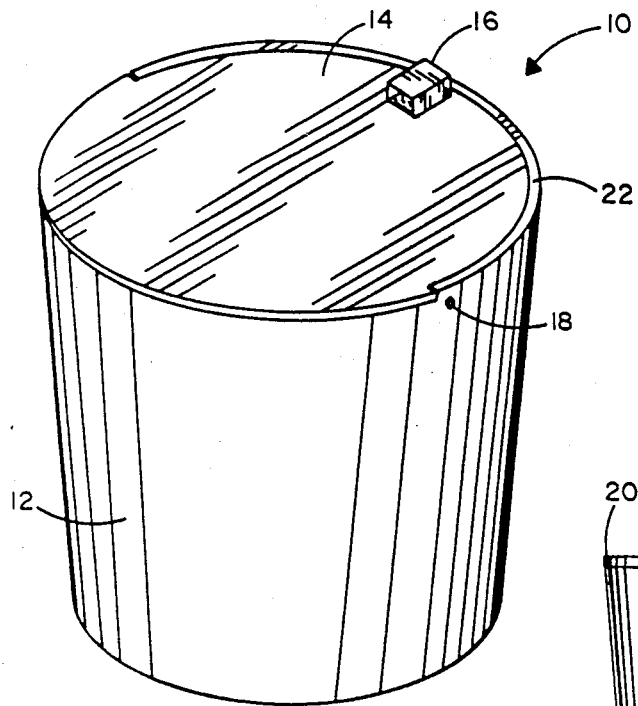
FIG. 1 is an isometric view of a first embodiment of the invention.

Referring first to FIGS. 1 through 4 it will be seen that the first embodiment of the animal trap 10 of the present invention comprises a container 12 which may be of generally cylindrical configuration and having a circular top or door 14 to which is connected a bait box 16 for containing a bait attractive to a particular animal to be trapped as hereinafter more fully explained. The top or door 14 is designed to rotate about a centrally located fulcrum 18 positioned on either side of the top or door 14. As seen best in FIG. 2, the top of the container 12 has a container lip 22 and as seen best in FIG. 3, the top or door 14 may be divided into two sides including a non-trigger side 28 and a trigger side 30.

Figure 2:
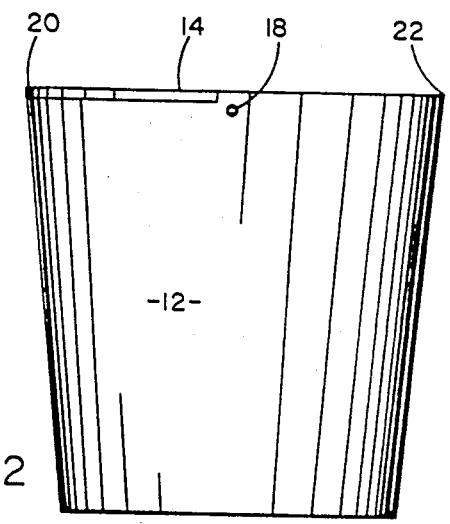
FIG. 2 is a side view of the first embodiment of the invention.
Figure 3:
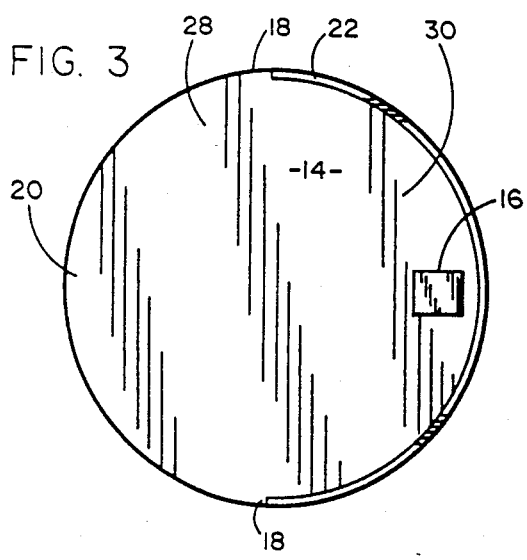
FIG. 3 is a top view of the first embodiment of the invention.
Figure 4:
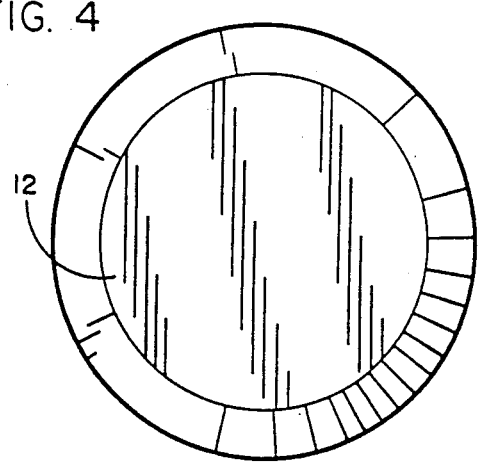
FIG. 4 is a bottom view of the first embodiment of the invention.

The non-trigger side 28 is provided with a door lip 20 which is designed to extend over and engage the container lip 22 when the top is in its closed configuration as illustrated in FIGS. 1, 2 and 3. On the other hand, the trigger side 30 of the top or door 14, that is, the portion of the top or door 14 to the right of the fulcrum 18 as seen in FIG. 3, has no door lip 20 and thus terminates short of the container lip 22 allowing the door or top 14 to rotate about the fulcrum 18 in response to a downwardly directed force on the trigger side 30 of the top or door 14. Furthermore, it will be seen best in FIG. 3 that the bait box 16 is positioned on the trigger side 30 of the top or door 14 at a location adjacent the outer periphery of the trigger side 30.

Figure 5:
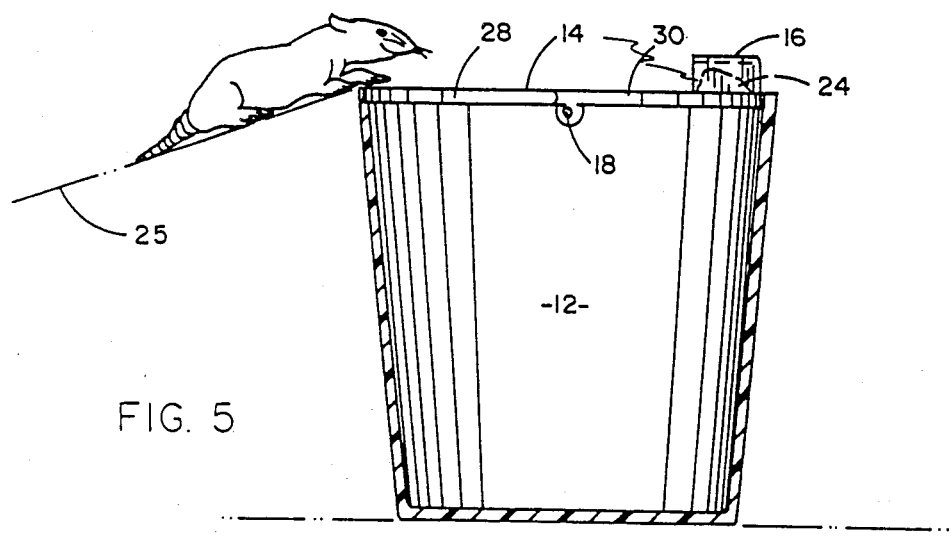
FIGS. 5, 6 and 7 sequentially illustrate the operation of the first embodiment of the invention.
Figure 6:
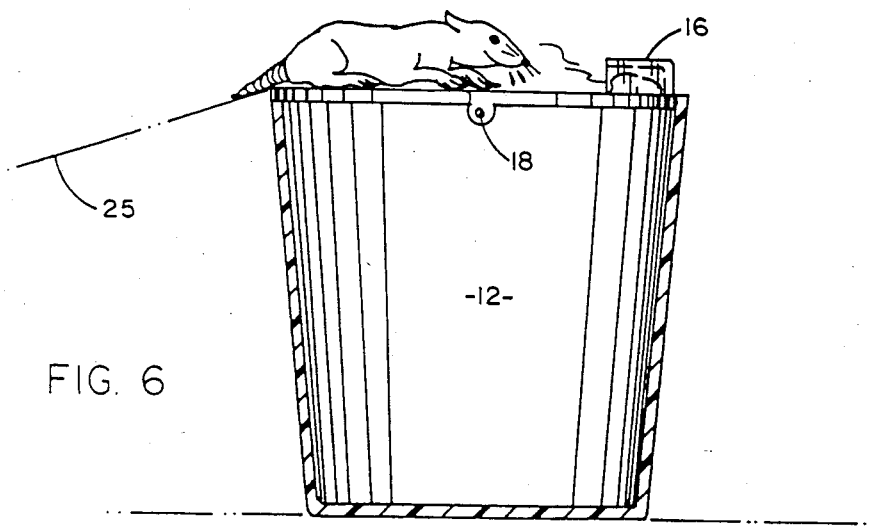
Figure 7:
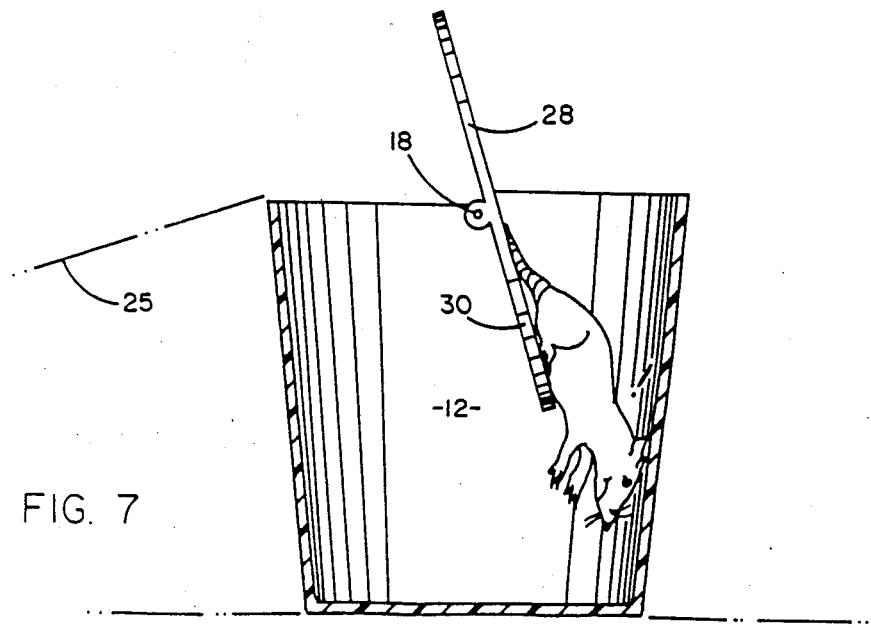
Figure 8:
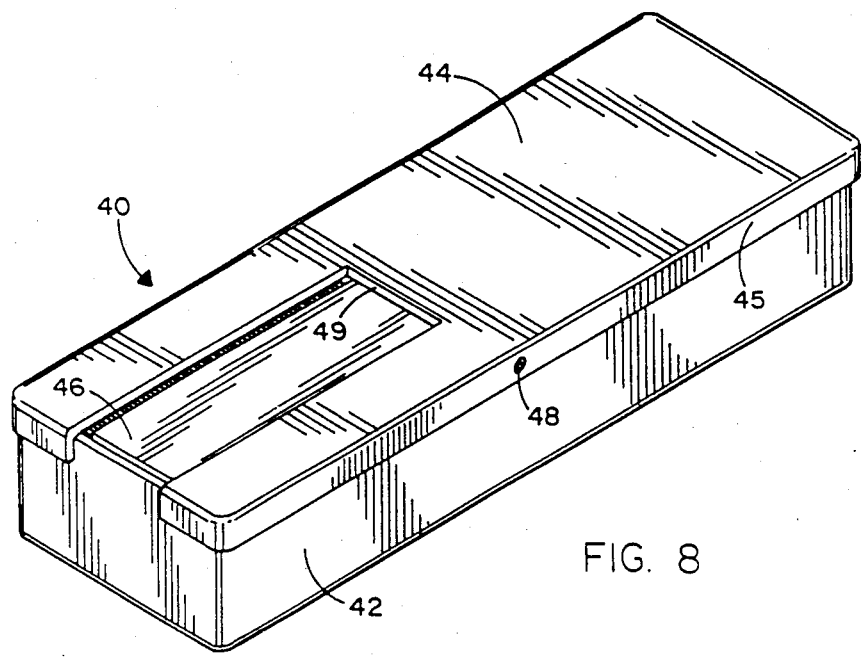
FIG. 8 is an isometric view of a second embodiment of the invention.
Figure 9:
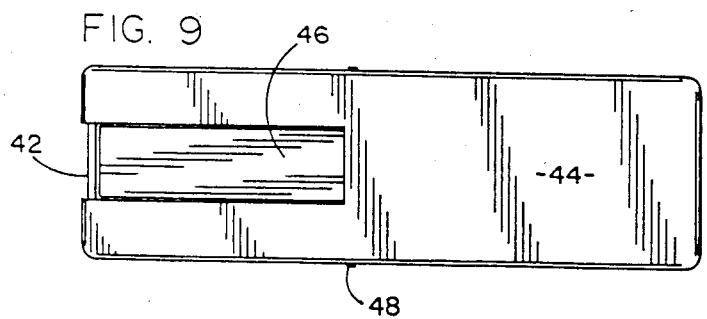
FIG. 9 is a top view of the second embodiment of the invention.
Figure 12:
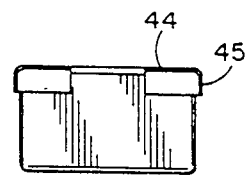
FIG. 12 is a first end view of the second embodiment of the invention.
Figure 10:
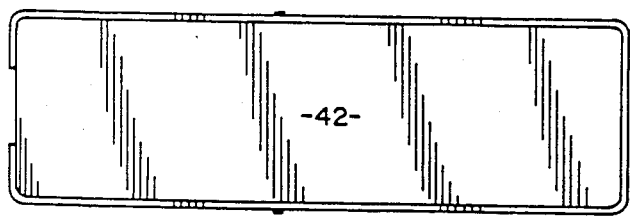
FIG. 10 is a bottom view of the second embodiment of the invention.
Figure 13:
FIG. 13 is a second end view of the second embodiment of the invention.
Figure 11:
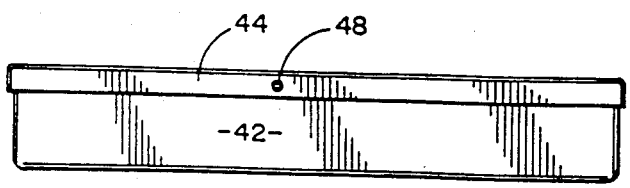
FIG. 11 is a side view of the second embodiment of the invention.

The operation of the first embodiment of the present invention may be understood best by reference to FIGS. 5, 6 and 7. As seen in those figures, the operation and reliability of the first embodiment of the invention is most assured when means are provided for the animal to be trapped to climb to the top of the container 12 whereby to initially place its weight on the non-trigger side 28 of the top or door 14 for approaching the bait box 16 which is provided with some form of attractive food or bait 24 as seen in FIGS. 5 and 6. This assures that all or virtually all of the animal's weight is on the top or door 14 and at least initially on the non-trigger side 28 before the animal transfers its weight to the trigger side 30 in an attempt to approach the bait 24. In order to provide this form of approach by the animal to be trapped it may be preferable to provide an optional ramp 25 which may be made integral to or added to the present invention to assure that the animal's only path of approach to the trap is by means of that ramp. However ramp 25 is not deemed to be an essential part of the present invention in that other forms of approach paths may be provided by the user such as for example, by placing piles of newspapers or other articles on the non-trigger side of the trap or by placing the trap in a position adjacent an elevated ground surface while denying the animal easy access to the trigger side of the trap.

In either case, as shown in FIG. 5, the animal will approach the trap from the non-trigger side 28 of the top or door 14 and as typical for the more clever animals, it will, in effect, test the non-trigger side to determine whether it has firm footing before proceeding further onto to top 14, placing virtually all of its weight on the non-trigger side 28. Being assured of the firm footing on the non-trigger side of the top, the animal will then approach the bait box 16 in order to obtain access to the bait contained therein and will in the process place all or a portion of its weight onto the trigger side 30 of the trap top or door 14. In response, the top or door 14 will rotate about fulcrum 18 thereby dropping the animal into the interior of container 12. For this purpose it is preferable that at least the top surface of the top or door 14 be of a relatively smooth texture so that the animal is, in effect, denied sufficient friction to avoid falling into the container 12.

Because the non-trigger side 28 of the top or door 14 is heavier than the trigger side 30, after the animal has fallen into the container 12 the top 14 will be automatically reset into its horizontal configuration, thus in effect, resetting the trap for catching additional animals. This additional weight on the non-trigger side 28 is normally provided by the asymmetry of the top geometry provided by the presence of a door lip 20 on the non-trigger side in the absence of a comparable door lip on the trigger side. However, if preferred, additional weight may be added to the non-trigger side such as by making the non-trigger side thicker than the trigger side or by adding weights of various kinds which may be readily glued or otherwise attached to the non-trigger side of the top 14.

The first embodiment of the invention may be provided in a variety of sizes and shapes for capturing a variety of different small animals. For example, it has been found that if container 12 is of the twenty gallon or ten gallon standard bucket configuration, the trap is suitable for capturing raccoons, skunks and opossum. A size equivalent to a five gallon standard bucket configuration has been found suitable for capturing rats, gophers, marmots, weasels and chipmunks as well as other small animals. A two and one-half gallon standard bucket size is also appropriate for capturing rats, gophers, marmots, weasels, chipmunks and other small animals. A trap configured in accordance with the first embodiment disclosed herein is also suitable for capturing mice when provided in a size equivalent to a standard quart or pint bucket. In addition, even smaller size containers and commensurately smaller doors, such as equivalent to a cup size, have been found effective in capturing certain insects such as cockroaches.

The bait used may of course by any of a variety of baits attractive to the various animals which it is intended to catch by means of the trap of the present invention. By way of example, rats are particularly attracted to apple slices, peanut butter and other foods. In addition, various pests are attracted to strong odors such as extracts including anise which has an odor of licorice. The interior of the container 12 may be partially filled with water or other liquid to drown the captured animals if desired or it may be coated with an layer of an oily or slippery substance to inhibit the animals' opportunities for escape from the interior of the bucket by providing virtually frictionless footing. The invention may also be provided with an optional handle such as a conventional pail handle for the convenience of the user for transferring the invention from one place to another.

The Second Embodiment

The basic concepts of the first embodiment of the invention described hereinabove may also be utilized in an alternative configuration illustrated in FIGS. 8 through 16 which has been found particularly suitable for capturing insects such as cockroaches. More specifically, referring now to FIGS. 8 through 16 it will be seen that the second embodiment animal trap 40 of the present invention comprises a container 42 having a top 44 which is provided with a slot or recess 49 seen best in FIGS. 8 and 9. The slot or recess 49 provides access to a door 46 which as seen best in FIGS. 14 through 16, is provided with a fulcrum 47 through which a pin 48 extends and the ends of which are connected for rotatable motion within a flange 45 of top 44.

As seen further in the cross-sectional views provided in FIGS. 14 through 16, the door 46 is, as in the first embodiment of the invention described hereinabove, provided with a trigger side 50 and a non-trigger side 52. In this particular embodiment, the trigger side 50 and non-trigger side 52 are integrally connected at an angle to permit rotation of the door in the manner illustrated in FIG. 16 in response to the weight of the insect on the trigger side 50 of the door 46. The non-trigger side 52 of the door 46 may be provided with a thickened or weighted end 54 so that the nominal configuration of the door is that shown in FIG. 14 wherein the trigger side is parallel to the top 44 and adjacent the recess 49. Of course, other means may be provided to assure this nominal configuration by for example, making the non-trigger side 52 of the door 46 from a material of higher density or by using other forms of weighting such as by using a wider configuration which inherently weighs more than the trigger side 50 of the door 46.

In either case, when the insect to be trapped places its weight on the trigger side 50 of the door 46, the weight of the insect will be sufficient to overcompensate for the difference in weight between non-trigger side 52 and trigger side 50 and as a result, the door 46 will rotate about the fulcrum 47 and pin 48. The insect will then either fall off or walk off the trigger side 50 in an attempt to get to the source of the attractive material or bait contained within the container 42. Here again various food substances as well as particularly sweet odor producing material such as anise may be provided in the interior of the container 42 to attract the insects.

Figure 14:
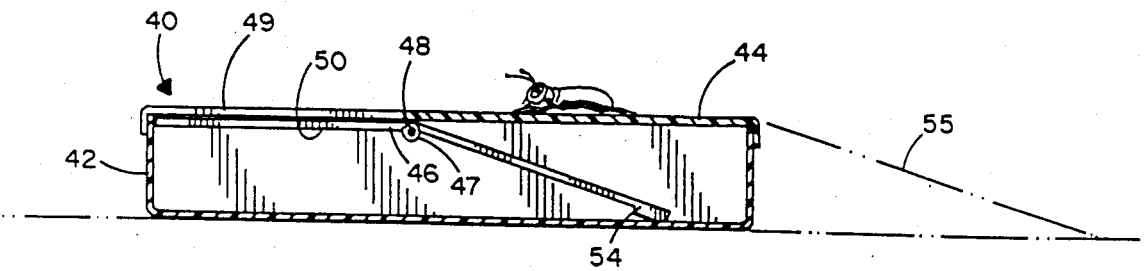
FIGS. 14 through 16 sequentially illustrate the operation of the second embodiment of the present invention.
Figure 15:
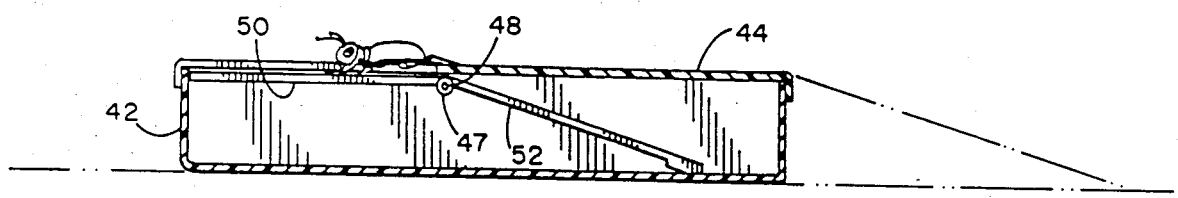
Figure 16:
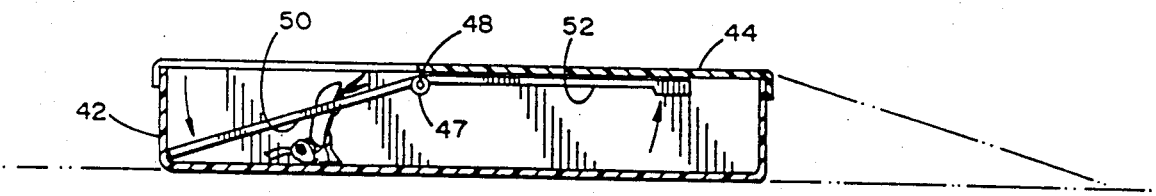

An optional ramp 55 may be provided as shown in the rightmost portion of FIGS. 14 through 16 to provide easy access to the top of the container for the insect to be trapped. However, it is understood that most insects have sufficient footing to climb the vertical walls of container 42 to reach the top in order to gain access to the interior of the container. It is preferable that the relationship between the top 44 and flanges 45 to the container 42 be sufficiently sealing in nature so that the odor escapes only from the recess 49 in the top 44 thereby attracting the insects to the top of the container and the trigger side 50 of the door 46.

The interior of container 42 may also be provided with a liquid such as water in order to drown the insects that fall therein. However, like the first embodiment of the invention described above, once an insect has been trapped within the interior of container 42 the configuration of the door 46 substantially prevents the escape of the insects to the exterior of the trap.

It will now be understood that what has been disclosed herein comprises a novel animal trap which is suitable for trapping a variety of animals and pests including those as small as insects such as cockroaches and those as large as raccoons. Two different embodiments of the invention have been disclosed herein, one of which is especially suited for capturing small pests including mice, rats, gophers, marmots, weasels, chipmunks, opossum, skunks and raccoons and a second embodiment which is especially suited for catching insects such as cockroaches. Each such embodiment utilizes a container which is closed at the top by a door which rotates in response to the animal's weight. In the first embodiment, the rotation of the top in effect, drops the animal into the interior of the container and in a second embodiment, rotation of the door provides an easy path for the insects to reach the interior to which they are attracted by a suitable bait or odor producing substance. In both embodiments the rotatable door or top is automatically reset when the animal or insect's weight has been removed from the trigger side of the door or top so that the trap is then reconfigured for catching additional animals or insects.

Those having skill in the art to which the present invention pertains will now as a result of the applicant's teaching herein, perceive various modifications and additions to the invention. By way of example, various other container geometries and door configurations will now be contemplated by those having the benefit of the applicant's teaching. However, all such modifications and additions are deemed to be within the scope of the present invention which is to be limited only by the claims appended hereto.

I claim:

1. An animal trap especially suited for catching insects and comprising:

a fully enclosed container having a top surface, a portion of said top surface having a slot exposing the trigger side of an elongated swinging door, said door having a non-trigger side that is marginally heavier than said trigger side, said trigger side and said non-trigger side being obtusely angled relative to one another and being integral to one another at a fulcrum positioned beneath said top surface, whereby the weight of an insect on said trigger side rotates said swinging door until said non-trigger side engages said top surface.

* * * * *